Sept. 2, 1941.    W. B. BARNES    2,255,020
VACUUM CONTROL FOR TRANSMISSIONS
Original Filed Dec. 12, 1935    4 Sheets-Sheet 1

INVENTOR.
William B. Barnes,
BY
Hood & Hahn.
ATTORNEYS.

Sept. 2, 1941.   W. B. BARNES   2,255,020
VACUUM CONTROL FOR TRANSMISSIONS
Original Filed Dec. 12, 1935   4 Sheets—Sheet 2

INVENTOR.
William B. Barnes,
BY
Hood & Hahn.
ATTORNEYS.

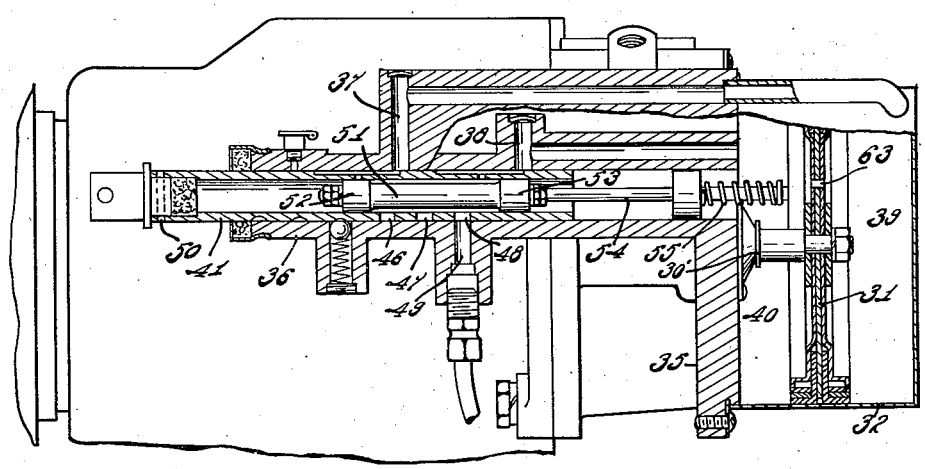

Sept. 2, 1941.   W. B. BARNES   2,255,020
VACUUM CONTROL FOR TRANSMISSIONS
Original Filed Dec. 12, 1935   4 Sheets—Sheet 4
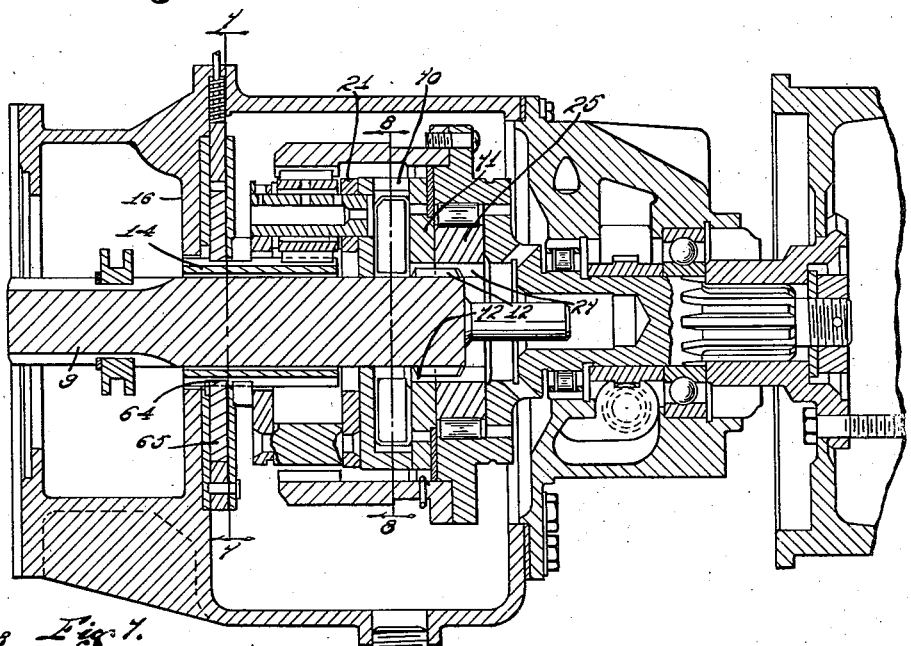
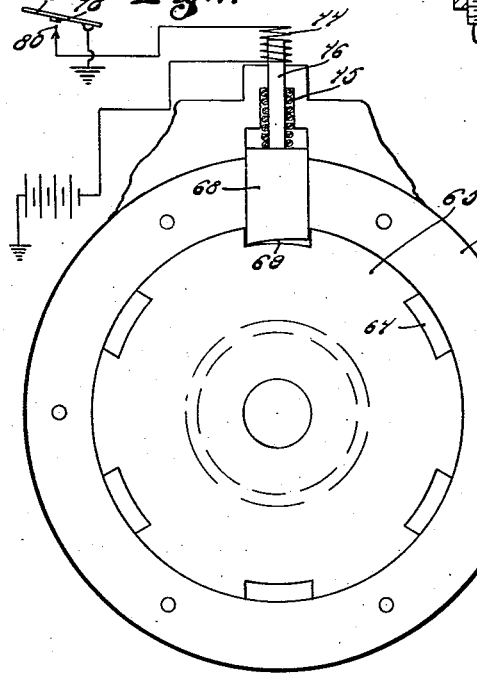
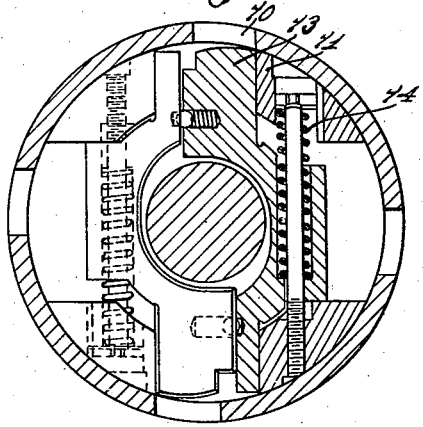
INVENTOR.
William B. Barnes,
BY
Hood & Hahn.
ATTORNEYS.

Patented Sept. 2, 1941

2,255,020

UNITED STATES PATENT OFFICE 2,255,020

VACUUM CONTROL FOR TRANSMISSIONS

William B. Barnes, Muncie, Ind., assignor to Barnes Motor Developments Company, Muncie, Ind., a partnership consisting of William B. Barnes and Freda Arthur Barnes Continuation of application Serial No. 54,016, December 12, 1935. This application May 18, 1939, Serial No. 274,427

111 Claims. (Cl. 74—472)

My invention relates to improvements in transmission gearing and particularly to that type of transmission gearing designed for use in connection with automobiles and like vehicles. More specifically, my invention relates to a transmission gearing adapted to provide a relatively fast speed drive for the vehicle and a relatively slow speed drive therefor, the slow speed drive becoming effective upon the release of the high speed drive.

One of the objects of my invention is to provide a transmission gearing having a relatively high speed drive and a relatively slow speed drive for the vehicle and to provide means whereby the operator may, by the manipulation of the accelerator pedal or throttle control of the engine, readily release said high speed drive and automatically effect the operation of the relatively low speed drive upon said release of the high speed drive. In certain types of vehicle drive, the power delivered to the vehicle wheels is somewhat reduced when operating on a relatively high speed drive. In this type of structure, the relatively high speed drive is adapted for obtaining an increased speed of the vehicle over that obtained by a relatively slow speed drive. Due to the fact that there is a decreased power delivered to the vehicle wheels when operating at the relatively high speed drive, the acceleration or "pick-up" of the vehicle, when so operated, is not as great as it would be if the vehicle were operated through a relatively lower speed drive. Occasion arises where a quicker acceleration is desired than that provided by the high speed drive as, for instance, when the driver is desirous of passing another vehicle and, under these conditions or circumstances, it is desirable to be able to shift down into the relatively slow speed drive for at least said passing period.

One of the objects of my invention is to provide a transmission wherein the shift-down from the relatively high speed drive to the relatively low speed drive may be effected simply through the manipulation of the accelerator pedal or engine throttle control member.

Another object of my invention is to provide an improved means for shifting a transmission into various positions through the instrumentality of the vacuum produced in the intake manifold of the driving engine.

Further objects and advantages of my invention will appear more fully hereinafter in the appended specification and claims.

The present application is a continuation of my application Serial No. 54,016, filed December 12, 1935.

For the purpose of disclosing my invention, I have illustrated certain embodiments thereof in the accompanying drawings, in which:

Fig. 5 is a longitudinal sectional view of the vacuum controlled mechanism shown in Fig. 2, slightly modified;

Fig. 6 is a longitudinal sectional view of a transmission embodying a further modification of my invention;

Fig. 7 is a sectional view on the line 7—7 of Fig. 6;

Fig. 8 is a sectional view on the line 8—8 of Fig. 6;

Fig. 9 is a transverse sectional view similar to Fig. 7 showing a modified form of control;

Fig. 10 is a detail view, more or less diagrammatic, of the clutch teeth of the structure illustrated in Fig. 3; and Fig. 11 is a view similar to Fig. 9 showing a further modified form of control.

Figure 1:
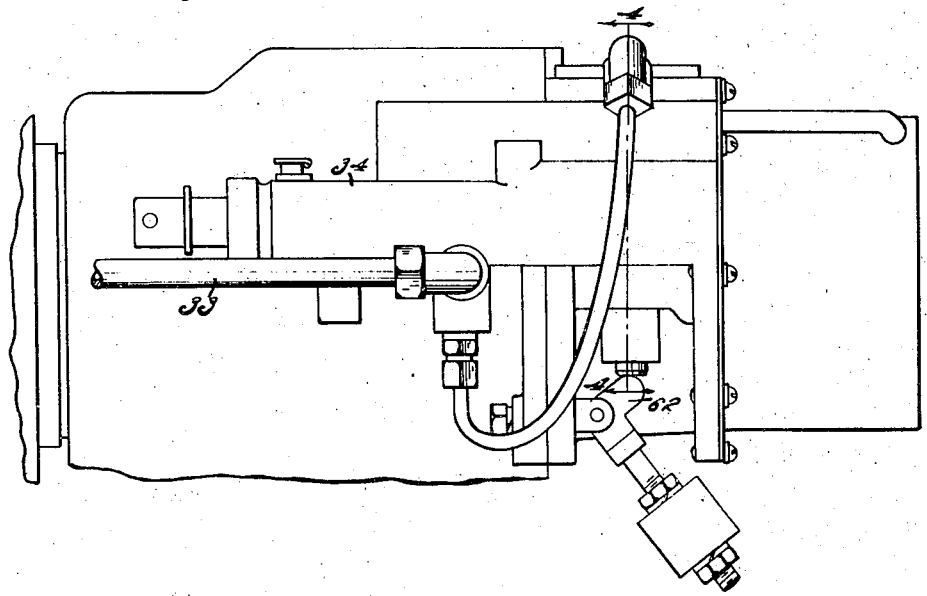
Fig. 1 is a side elevation of a transmission embodying a vacuum control.

In the structure illustrated, in Figs. 1 to 5, inclusive the relatively high speed drive is adapted to supplement the regular commercial transmission. To this end, I provide a casing I into which from the rear is adapted to extend the driven shaft 2 arranged for connection with the propeller shaft of the vehicle. This shaft 2 is mounted in suitable roller bearings 3 within the hub 4 of the casing and its inner end is provided with a head 5. This head is recessed and provided with the interior positive teeth 6 as well as an overhanging overrunning clutch member 7. The driving shaft 8 extends into the casing I at the front end and between the driving and driven shaft, I interpose a supplemental shaft or clutch member 9. This clutch member 9, at one end, is splined as at 10 to engage internal splines in the recessed end 11 of the driving shaft 8 and at its opposite end is provided with peripheral clutch teeth 12 for the purpose more fully hereinafter disclosed.

Surrounding the axially shiftable clutch member 9 is a sun gear 13 formed at one end of the sleeve 14 which is toothed at its opposite end to engage an internal toothed locking ring 15 resiliently anchored to the wall 16 of the casing through a suitable resilient anchoring means including the coiled springs 17. The anchoring means provides a means for preventing substantial rotation of the sleeve 14 in either direction and at the same time resiliently connects the sleeve to the casing so that the vibration noises will be more or less absorbed.

Surrounding the sun gear 13 is a plurality of planet pinions 19 mounted on stub shafts 20 carried in the pinion cage 21. This pinion cage is provided with internal clutch teeth 22 arranged for engagement with the clutch teeth 12 on the shiftable clutch member 9. The planet pinions in turn nest and mesh with a ring gear 23 supported on the head 5 and secured by suitable bolts or otherwise to an annular flange 24 formed on the periphery of the head 5.

A second member 25 of an overrunning clutch surrounds the axially shiftable clutch member 9 and this member on its periphery is provided with a plurality of cammed surfaces adapted to cooperate with the rollers 26 and the outer clutch member 17 to form a one-way or overrunning clutch.

So far, the operation of the gearing is as follows: with the clutch teeth 12 in engagement with the clutch teeth 27 on the clutch member 25, the driving shaft 8 is connected with the driven shaft 2 through the axially shiftable member 9 and through the overrunning clutch, thus establishing a one-way drive between the driving and driven shafts which at the same time, in the event the driven shaft tends to operate faster than the driving shaft, will permit the driven shaft to overrun or become disconnected from the driving shaft. With the clutch member 9 shifted to the extreme right, looking at Fig. 3, and the clutch teeth 12 engaging the clutch teeth 6, a direct two-way drive is established between the driving and driven shafts. With the clutch teeth 12 shifted to the left, looking at Fig. 3, and meshing with the clutch teeth 22 on the pinion cage of the planetary gear, a drive will be established through the planetary gear causing the driven shaft to operate at a greater speed than the driving shaft. In this position, the teeth 12 are not entirely disengaged from the teeth 27. However, this makes no difference because of the interposition of the overrunning clutch and as long as the driven shaft 2 rotates at a higher speed than the driving shaft 8, under the influence of the planetary gearing, the overrunning clutch will not function.

The axially shiftable clutch member 9 is provided with a grooved collar 28 secured thereon which receives the shifting fork 29 mounted on a shift rod 30. This shift rod is adapted to be moved to its respective positions through the instrumentality of the vacuum produced in the engine manifold. To this end, I provide on the end of the rod 30 a piston 31 operating in a closed cylinder 32 which, through suitable valve instrumentalities, is connected by the pipe 33 with the intake manifold of the usual engine of an automobile. For controlling the operation of the piston 31, I provide a suitable valve mechanism formed in a casting 34. At one end of this casting is provided a head 35 forming the inner wall of a cylinder 32.

The control valve includes a valve cylinder 36 having suitable ports 37 and 38 connected to this cylinder 32 respectively on opposite sides 39 and 40 of the piston 31. Operating within this cylinder 36 is a sleeve valve 41 having formed on its face thereof a pair of elongated recesses 42 and 43 which recesses have formed in the walls thereof elongated slots 44 and 45 respectively. These slots or ports 44 and 45, are adapted, under predetermined conditions, to provide communication with the ports 37 and 38. In addition to the slotted ports 44 and 45 I provide on the opposite side of the sleeve a series of ports or openings 46, 47 and 48 which, under certain predetermined positions, communicate with the pipe 33 through the port 49 in the valve casing 36.

Operating within this sleeve valve, which it will be noted at its rear end is provided with escape ports 50, is a piston valve 51 having on its opposite ends pistons 52 and 53 adapted to control respectively the ports 44 and 45. This piston is provided with a stem 54 extending into the cylinder 32 and biased to follow the movement of the piston to the right, looking at Fig. 2, by the coiled spring 55.

A lock up stem 56 extends at right angles to the axis of the shift rod 30 and is mounted in the casting forming a part of the control valve. This rod at one portion is provided with a reduced neck 56' and the rod cooperates with a ball 57 interposed between it and the shift rod 30 and lying in elongated recess 58 formed in one side of the shift rod 30. In normal position, this stem is in a position shown in Fig. 4 whereby the neck 56 is beneath the ball 57 and maintains the ball in the recess 58.

The upper end of the rod is connected with a diaphragm 59 forming one wall of a chamber 60 and at its upper end the rod is provided with a coiled spring 61 tending to bias the rod in its raised position. The chamber 60 is adapted to be connected through the pipe 60' with the pipe 33 to thereby connect the chamber 60 with the intake manifold of the engine.

In the position illustrated in the drawings, the parts are in a position of equilibrium with the teeth 12 in engagement with the teeth 27. Therefore, the drive is direct through the overrunning clutch. It will be noted that in this position, both ports 37 and 38 are placed in communication with the port 49 and thus in communication with the intake manifold of the engine so that a condition of a subatmospheric pressure exists on both sides of the piston 31. If now, the operator, through a suitable dash control, shifts the sleeve valve 41 to the left, looking at Fig. 2, the sleeve valve will place the port 48 in communication with the port 49, at the same time moving the port 37 into communication with the atmosphere through the port 37, the port 44, the sleeve and the opening 50 in the sleeve. With the parts in this position, assuming that the engine is being driven under normal conditions with the throttle open, conditions in the cylinder 32 will not be materially changed as it is well understood that with an open throttle, substantially no or very little vacuum is produced in the manifold. As soon, however, as the operator sufficiently closes the throttle by removing his foot, say from the accelerator, a high vacuum is produced in the manifold and due to the fact that the chamber 40 of the cylinder 32 has been placed in communication with the manifold through the port 38, the port 45 in the sleeve valve, the port 48 in the sleeve valve, and the pipe 33, a strong subatmospheric pressure is developed in the side 40 of the cylinder 32 moving the piston 31 to the left, looking at Figs. 2 and 3, and thus shifting the shift rod 30 to engage the teeth 12 with the teeth 22 of the pinion cage of the planetary gear and thereby establishing an overdrive to the driven shaft through this gearing. During this movement, the piston 31 engages the stem 54 of the piston valve 50 causing the piston valve 50 to move to the left to the same relative position with respect to ports 44 and 45 as it occupies when in the position shown in Fig. 2, thus again placing both sides 40 and 39 of the cylinder in communication with the manifold of the engine and establishing a condition of equilibrium so that the parts will remain in this position until the sleeve valve is shifted to another position.

Assuming that the parts have been shifted into the high speed drive relation, if now, the sleeve valve is shifted to the right back to its initial position, then the port 44 will have been moved to the right beyond the piston 52 and the port 47 will be placed in communication with the port 49. However, the port 45 will have been shifted to the right beyond the piston 53 thus closing communication between the port 38 and the manifold.

Under these conditions, subatmospheric pressure will have been produced in the side 39 of the cylinder 32 causing the piston 31 to move to the right and moving the shift rod 30 back to the initial position, establishing direct drive through the overrunning clutch. Further movement of the shift rod 30 would be prevented by the locking stem 56 and the ball 57. With the movement of the piston 31, the stem 54 moves to the right following the piston 31 until the piston valve 51 reaches its initial position, that is, the position illustrated in Fig. 2, when the parts will again be in equilibrium.

If now, the operator wishes to establish a relatively low speed two-way drive, the sleeve valve 41 would be moved further to the right, thereby establishing communication between the ports 49, 46 and 37 and as the piston valve 51 is stationary, closing the port 38 against the admission of subatmospheric pressure. This, of course, would establish predominated subatmospheric pressure in the cylinder portion 39. But, due to the fact that the ball 57 is engaging the extreme lefthand wall of the slot 58, the shift rod cannot be moved. This lock-up is provided to prevent shifting into relatively low speed drive when, for any reason, the driven shaft is operating faster than the driving shaft. As soon, however, as the operator opens his throttle fairly wide, the engine will be speeded up so as to increase the speed of the driving shaft 8 and as soon as the overrunning clutch takes hold, increasing the speed of the driven shaft 2, this will cause a surge in the car causing the weight 61 to swing to the position illustrated in Fig. 1, thus operating the bell crank lever 62 to kick the stem upwardly until the neck 56' is opposite the ball 57. This will permit the ball to drop into the neck and out of the groove 58 releasing the shift rod 30 so that it can move to the extreme position to the right, engaging teeth 12 with the teeth 6 and establishing a relatively low speed two-way drive.

Figure 2:
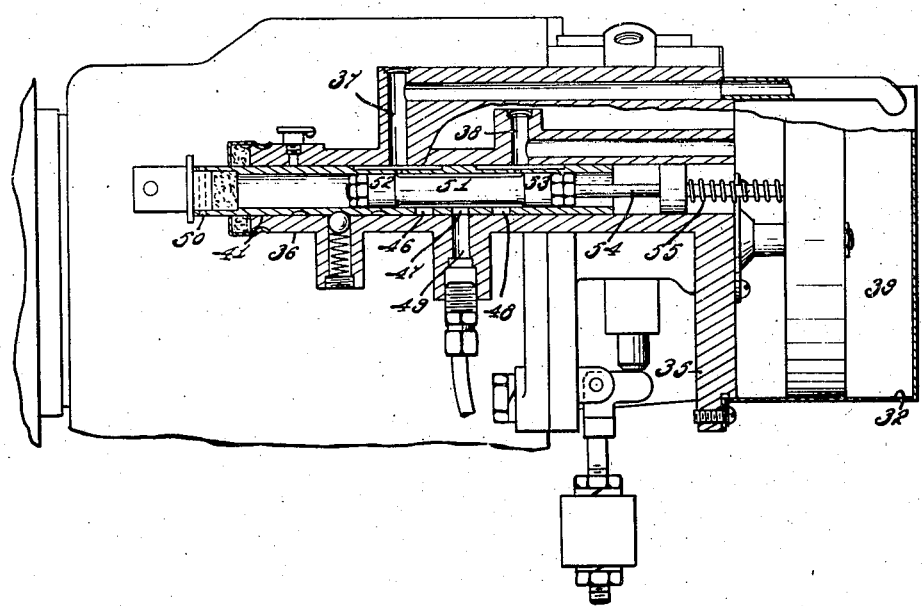
Fig. 2 is a sectional view of the vacuum control mechanism.

In the structure illustrated in Fig. 5, due to the collar 30' on the stem 30, movement of the piston 31 and the piston valve 51 is less than in the structure illustrated in Fig. 2 so that by the time the piston 31 is moved to the limit of its stroke to the left, the piston 52 will have covered the port 44. This movement, however, is sufficiently great to engage teeth 12 with teeth 22.

In addition, I provide a bleed opening 63 in the piston 31. Under these circumstances, with the sleeve valve 41 moved to its extreme left-hand position, referring to Fig. 5, that is, a position which will throw the overdrive gearing into operative relation, the piston 31 will have been moved to the left, moving the piston valve 51 so that the port 44 will have been closed by the piston valve 51. Under these circumstances, the chamber 39 of the cylinder 32 will have been sealed.

However, the chamber 40 of the cylinder 32 is in communication through the port 45 in the sleeve valve 41 with the manifold of the engine through the medium of the pipe 33. If now, the operator desires to return to direct drive for the purpose of obtaining a quicker acceleration than can be obtained through the high speed drive, as in passing another car, or for any other reason, he momentarily closes the throttle to permit a slight "overrun" of the vehicle. This releases the torque resistance on the clutch teeth 12 and 22. He then quickly or suddenly opens the throttle and under these circumstances, the vacuum or subatmospheric pressure in the chamber 40 will be reduced, eventually reaching approximately zero, in accordance with the well understood principle that opening of the throttle of an engine will reduce the vacuum in the intake manifold. The moving of the throttle toward closed position and then promptly moving the same to open position will not result in any significant loss of vehicle speed. When this occurs, with the reduced subatmospheric pressure on the side 40 and the maintained relatively subatmospheric pressure on the side 39, the piston 31 will be moved to the right, shifting the drive out of overdrive and into a two-way drive. As this occurs, the stem 54 will follow the piston 31, thereby moving the piston valve 51 to a position whereby the port 44 is thrown into communication with the atmosphere and the port 45 maintained in communication with the manifold. This shifting action takes place quickly so that the shift is made before the torque resistance on the teeth 12 and 22 becomes sufficiently great to prevent their disengagement.

With the throttle open, then the subatmospheric pressure on each side of the piston 31 will have been reduced to zero.

Now, if the operator wishes to again automatically move into high speed drive position by removing his foot from the accelerator or closing his throttle, the subatmospheric pressure in the side 40 of the piston 31 will have been again increased, thereby shifting the piston back into a position of overdrive. It is thus seen that by a simple manipulation of the throttle of the engine, applicant can automatically shift into and out of overdrive position.

It is thus seen that in the above-described structure I have provided a device whereby by first momentarily closing the throttle and then suddenly opening the same, I am enabled to shift back from relatively high speed drive into relatively low speed drive and that after the necessity for this low speed drive arrangement is overcome and it is desired to shift again into high speed, I am enabled by the manipulation of the accelerator throttle control to again shift into overdrive.

In the structure illustrated in Figs. 6, 7 and 8 I have shown a further modification wherein the same result may be accomplished in a structure having means for automatically establishing a relatively high speed drive when the speed of the driving shaft reaches a predetermined point. In this structure, the sun gear sleeve 14 is connected to the casing through the instrumentality of a controlled brake mechanism. To this end, the splines or teeth on the sun gear sleeve engage the internal teeth 64 of a rotatable disc 65. This disc operates within a ring 66 bolted, or otherwise secured, to the wall 16 of the casing. The disc 65 is provided with a series of notches or recesses 67, and slidably mounted and radially movable in the disc 66 is a dog 68, one face of which is cammed as at 69, and which dog is adapted to engage in any one of the notches 67 for locking the sun gear to the casing and thereby holding the same stationary.

The pinion gear cage 21 is provided with an annular flange having a series of notches or openings 70 formed therein. Surrounding the axially shiftable shaft 9 is what may be termed a core member 71 having internal teeth 72 for engagement with the teeth 12 of the axially shiftable member 9 when this member is moved to the limit of its movement to the left. This core member has a pair of radially disposed grooves on its front face within which are mounted centrifugally operated dogs 73 having their faces cammed in substantially the same manner as the cam faces 69 of the dogs 68. As a result of the camming of the faces of the dogs in this manner, the dogs will enter the recesses 70 only when there is a very slight relative movement between the cage 21 and the core member 71. These dogs 73 are normally biased in retracted position by means of coiled springs 74, so set that the centrifugal force acting upon the dogs proper will overcome these springs at a preselected speed. In other respects, the planetary gear structure is substantially the same as that illustrated in Fig. 3 except in this particular structure the member 9 is manually shifted for selecting the drive; when the member 9 is shifted to the limit of its movement to the right, direct two-way drive is established; when the teeth 12 of the member 9 engages only the teeth 27 of the inner member 25 of the overrunning clutch, relatively low speed one-way drive is established; and overspeed drive relation is established when the teeth of the member 9 engage the teeth 72 of the core member 71. With the sun gear sleeve 14 locked against rotation and with the teeth of the member 9 engaging the teeth of the core member 71, the core member will be rotated from the driving shaft. When the speed of the driving shaft reaches a predetermined point centrifugal force will throw the dogs 73 out towards engaging position, but due to the fact that when the parts are being rotated as described at this or above this speed, the ring gear will be driving the pinion cage 21 at a slower speed than the speed of the core member 71. Therefore, in order to cause the dog 73 to engage, the operator removes his foot momentarily from the accelerator pedal thus permitting the drive shaft to drop down in speed slightly, but not below the critical speed for operating the dog 73 and as the pinion cage 21 and the dogs 73 reach substantial synchronism, the dogs will slip into their respective slots 70 clutching the pinion cage to the driving shaft and thereby establishing the relatively high speed drive.

With the overspeed drive in operation there occurs a period in the operation of the automobile when it is desired to establish low speed drive conditions as, for instance, in a sudden acceleration for the purpose of passing another car. To this end, I have provided the braking arrangement for holding the sun gear sleeve against rotation. The dog 68 is biased in an engaging position through the coiled spring 75 and this dog is provided with a stem 76 which forms a core member of a solenoid 77. The circuit of the solenoid includes a contact 78 on the accelerator pedal 79 connected with the ground, and a contact 80 located in a position to be engaged by the contact 78 when the accelerator pedal is fully depressed. This contact is connected with one terminal of the solenoid 77 and the opposite terminal is connected with one terminal of a battery or other suitable source of electrical supply, the opposite terminal thereof being grounded.

In this construction as in the construction disclosed in Fig. 5, if the driver wishes to go into low speed drive from high speed drive without reducing the speed to the point where the dogs 73 disengage, he momentarily removes his foot from the accelerator pedal 79 thus permitting the vehicle to overrun and consequently relieving the dog 68 of any torque tension and establishing substantially no load conditions thereon. Then, by suddenly depressing the accelerator pedal 79 to engage the contacts 78 and 80 the circuit through the solenoid will be closed and, due to the release of the load on the dog 68 the solenoid will operate to disengage the dog 68 from one of the notches 67 thus releasing the sun gear sleeve 14 and permitting the sun gear to rotate. The reaction through the planetary gear will thus not take place and a low speed drive will be established.

As soon, however, as the foot is raised slightly from the accelerator pedal, a sufficient distance to disconnect contacts 78 and 80, the solenoid will be deenergized, permitting the spring 75 to act to move the dog into engaging position. There will be a tendency under these circumstances for the sleeve 14 to slow down and by the time the sleeve 14 has reached substantial synchronism with the dog, the dog will engage and the parts will again be locked up for the relatively high speed drive relation.

If it be desired to increase the speed of the car without shifting into low speed drive, as above-described, it is only necessary for the operator to gradually depress the accelerator pedal and even though eventually the accelerator pedal has been moved down to the point where the contacts 78 and 80 engage, the load imposed on the dog 68, as a result of this gradual application of the load, will be so great that the power of the solenoid will not be sufficient to overcome the same and the dog will remain locked up.

By this construction, it is therefore seen that I accomplish substantially the same result as that accomplished in the structure illustrated in Fig. 5, namely, the shifting from one drive ratio to another drive ratio. That is, the shifting from the relatively high speed drive to the low speed drive by the sudden or accelerated depression of the accelerator pedal or throttle control and the shifting back into the original drive ratio, the high speed drive, is accomplished by the closing of the throttle, or the releasing of the accelerator pedal.

Figure 3:
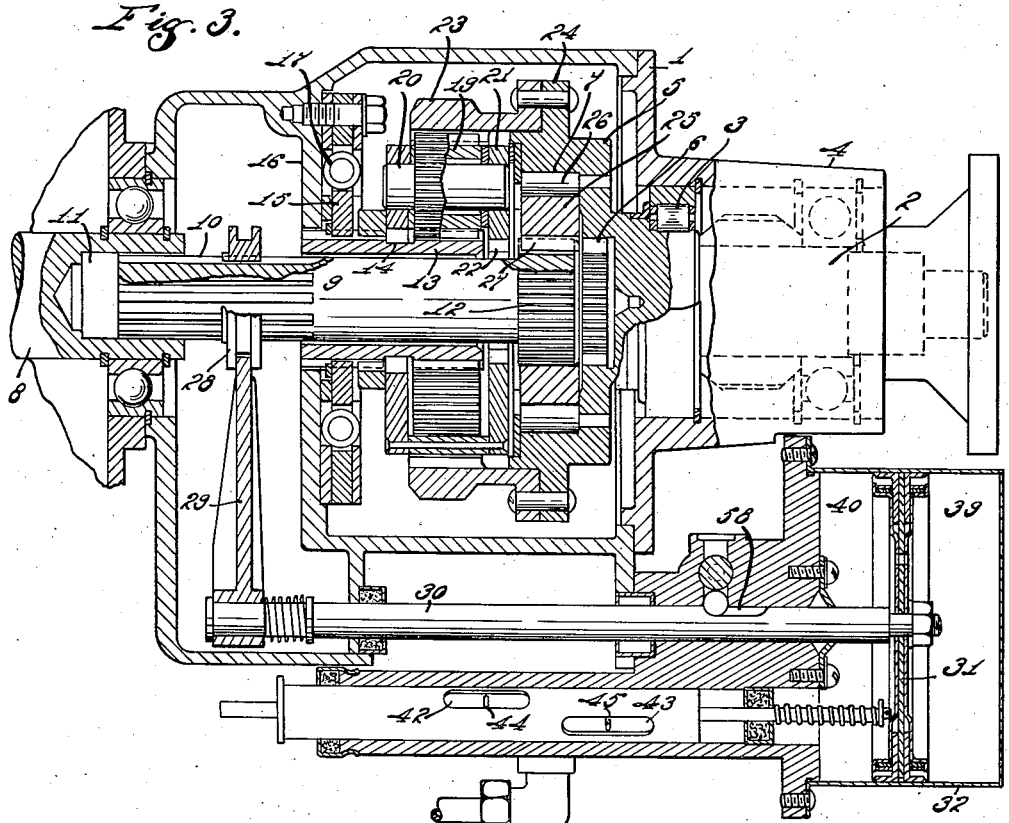
Fig. 3 is a horizontal sectional view of a transmission and a vacuum controlled mechanism.
Figure 4:
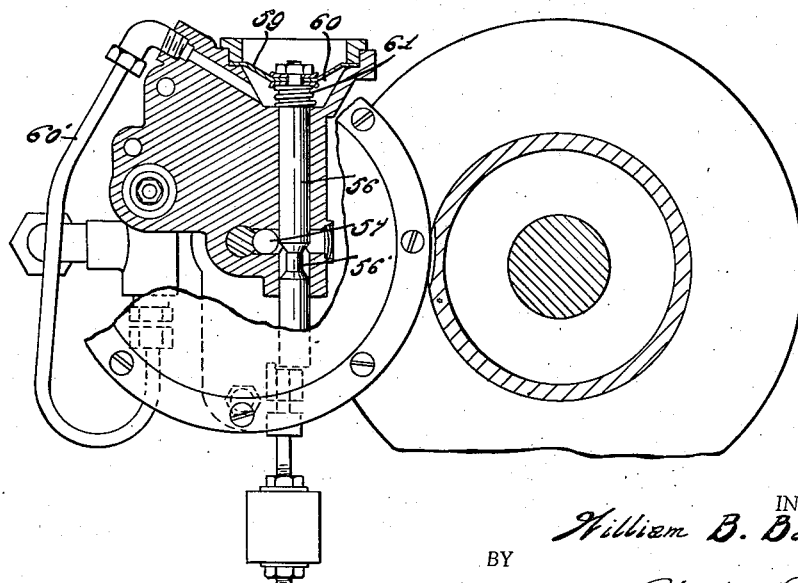
Fig. 4 is a detailed section on the line 4—4 of Fig. 1.

In the structure illustrated in Fig. 3, I insure the engagement of the teeth 27 with the teeth 22 of the teeth 16 only when the parts have reached substantial synchronism. To this end the faces of the teeth 22 are beveled or chamfered, as shown in Fig. 10, on both sides as at 81 and 81' and the teeth 12 on the edge adjacent the teeth 22 are likewise chamfered as at 82 and 82'.

As a result, when these teeth are moved into engaging position, the teeth will ratchet over one another until substantial synchronism is approached and then moved into engagement. Due to the fact that the relative movement between teeth 6 and the teeth 12 is always only in one direction, I accomplish the same result by chamfering the ends of the teeth 6 as illustrated at 84 and the ends of the teeth 12 as at 83.

In Fig. 9 I have illustrated a modified form of accelerator pedal control mechanism. In this structure, the dog 68 is connected through the medium of a Bowden wire connection 85 with one arm 86 of a bell crank lever. The Bowden wire connection extends through the arm 86 and is provided on its end with a stop 87, a coiled spring 88 being interposed between the arm 86 and the stop 87. The other arm 89 of the bell crank lever, through the medium of the link 90 is connected by a ball and socket joint 91, with the underside of the accelerator pedal 79. The stop 87 is spaced sufficiently from the arm 86 so that even though the accelerator pedal is moved downwardly to its limit, the arm 86 will not engage the stop 87 and, therefore, the coiled spring 88 is relied upon entirely for moving the Bowden wire to disconnect the dog 68 from one of the slots 67. In this construction, as well as the construction illustrated in Figs. 6, 7 and 8, when the accelerator pedal be moved toward closed throttle position the overrun of the vehicle will tend to release the load on the dog 68. Then, if the accelerator pedal is suddenly depressed placing the coiled spring 88 under heavy tension, sufficient to overcome the tension of the spring 75, the dog 68 will be moved out of engagement with one of the slots 67 permitting the direct drive to be established. However, if the accelerator pedal is depressed gradually the friction load upon the dog 68 will be sufficiently great to prevent the spring 88 from disengaging the dog.

In Fig. 11, I have illustrated a still further modification of the means for releasing the dog 68 from one of the slots 67. In this structure a cylinder 92 is connected by conduit 93 with the intake manifold of the engine. Operating within this cylinder is a piston 94 connected to the stem 95 of the dog 68. Interposed between this piston 94 and a wall 96 of the cylinder 92 is a coiled spring 97 biasing the dog 68 in its retracted or out of engagement position. During normal operation of the engine the subatmospheric pressure in cylinder 92 is sufficiently great to operate upon piston 94 and maintain the dog 68 in its engaged position. If however, the operator after having first moved the accelerator pedal toward closed throttle position to permit the overrun of the vehicle, thus releasing the load from the dog 68 and then suddenly depresses the accelerator pedal, the subatmospheric pressure in the cylinder 92 will be reduced to such an extent that the spring 97 will move the dog 68 out of its engaged position and permit the establishment of the low speed drive. However, if without first closing the throttle the accelerator pedal is moved downward into open throttle position the load imposed upon the dog and the gradual acceleration of the engine will permit the dog to remain in its engaged position.

It is, therefore, obvious, particularly with reference to the structures illustrated in Figs. 6, 7, 8, 9 and 11, that when shifting from the relatively high speed drive to the relatively low speed drive, the operator, by first moving the accelerator pedal in a closing direction, removes any thrust or binding load from the dog 68 and then, by moving the accelerator pedal in open direction, retracts the dog 68 from its holding position before a binding load may be re-established on the dog.

I claim as my invention:

1. In a driving system for an automotive vehicle, having an engine throttle control member, the combination with a driving shaft and a driven shaft, a speed-changing gearing associated with said shafts for driving said driven shaft at variable speed ratios, means operated by the combined movement of said throttle control member first in a closing direction and then suddenly in an opening direction to operate said gearing to effect a change of speed ratio between said driving and driven shafts, and means associated with said throttle control member for preventing said change of speed ratios upon the gradual movement of the throttle member in an open direction.

2. In a driving system for automotive vehicles, having an engine throttle control member, the combination with a driving shaft and a driven shaft, of a speed-changing gearing associated with said shafts for driving said driven shaft at variable speed ratios, means dependent upon the combined movement of the throttle control member in a closing direction and then the speed of the movement of said throttle control member in open direction for operating said gearing to effect a changed speed ratio between said driving and driven shafts, and means associated with said throttle control member for preventing the operation of said first-mentioned means by a gradual movement of the throttle control member in an opening direction.

3. In a driving system for automotive vehicles, having an engine throttle control member, the combination with a driving and a driven shaft, of a planetary speed-changing gearing associated with said shafts for driving said driven shaft at variable speed ratios, means dependent upon the combined movement of the throttle control member in a closing direction and then the speed of movement of said throttle control member in open direction for operating said gearing to effect a change of speed ratio between said driving and driven shafts, and means associated with said throttle control member for preventing said change of speed ratios upon a gradual movement of the throttle control member in an open direction.

4. In a driving system for automotive vehicles, having an engine throttle control member, the combination with a driving shaft and a driven shaft, of a planetary gearing for effecting change speed relation between said shafts and means dependent upon the combined movement of said throttle control member in a closing direction and then the movement of said throttle control member in open direction for operating said gearing to effect a changed speed ratio between said driving and said driven shafts, and means associated with said throttle control member for preventing said change of speed ratios upon a gradual movement of the throttle member in an open direction.

5. In a driving system for automotive vehicles, having an engine throttle control member, the combination with a driving shaft and a driven shaft, of speed-changing gearing associated therewith, means dependent upon first the moving of the throttle control member toward closed position and then upon the speed of movement of said throttle control member in open direction for operating said gearing to effect a change of speed ratio between said driving and driven shafts, and operated by movement of said throttle member towards closed position for re-establishing a speed ratio between said shafts, and means associated with said throttle control member for preventing said first-mentioned operation upon the gradual movement of the throttle control member in an open direction.

6. In a driving system for automotive vehicles, having an engine throttle control member, the combination with a driving shaft and a driven shaft, of a planetary speed-changing gearing associated with said shafts for driving said driven shaft at variable speed ratios, means dependent upon the combined movement of said throttle control member in closing direction and then in open direction for operating said gearing to effect a change of speed ratio between said driving and driven shafts and dependent upon movement of said throttle control member in a closed throttle direction for restoring said speed ratio between said shafts, and means associated with said throttle control member for preventing said first-mentioned operation of said gearing upon the gradual movement of the throttle control member in an open direction.

7. In a driving system for automotive vehicles, having an engine throttle control member, the combination with a driving shaft and a driven shaft, of a speed-changing gearing associated with said shafts for driving said driven shaft at variable speed ratios, manually controlled means for selectively effecting an overdrive of said driven shaft through said speed-changing gearing, and means dependent upon the speed of movement of said throttle control member in open direction for operating said gearing to effect a direct drive between said shafts.

8. In a driving system for automotive vehicles, having an engine throttle control member, the combination with a driving shaft and a driven shaft, of a speed-changing gearing associated with said shafts for driving said driven shaft at variable speed ratios, manually operated means for selectively effecting an overdrive of said driven shaft through said speed-changing gearing, and means dependent upon the speed of movement of said throttle control member in open direction for effecting a shift in said gearing to establish a direct drive between said shafts.

9. In a driving system for automotive vehicles, having an engine throttle control member, the combination with a driving and a driven shaft, of a planetary speed-changing gearing associated with said shafts for driving said driven shaft at variable speed ratios, manually operated selective means for effecting an overdrive of said driven shaft through said planetary gearing and means dependent upon the speed of movement of said throttle control member in open direction for effecting a shift in said gearing to establish a direct drive between said shafts.

10. In a driving system for automotive vehicles, having an engine throttle control member, the combination with a driving shaft and a driven shaft, of a planetary gearing for establishing an overdrive of said driven shaft from said driving shaft, selective means for establishing a connection between one of the members of said planetary gearing and the driving shaft to establish an overdrive between said driving shaft and said driven shaft and means dependent upon the speed of movement of said throttle control member in open direction for re-establishing a direct drive between said shafts.

11. In a driving system for automotive vehicles, having an engine throttle control member, the combination with a driving shaft and a driven shaft, of a planetary gearing associated with said shafts for driving said driven shaft at variable speed ratios, manually operated means for selectively connecting one of the members of said planetary gearing with the driving shaft to effect an overspeed drive of said driven shaft and means dependent upon the speed of movement of the throttle control member in open direction for re-establishing a direct drive between said shafts, said means upon the movement of the throttle in closed direction re-establishing the overspeed drive.

12. The combination with a transmission including a gear for establishing a change speed drive between the drive shaft and the driven shaft of a vehicle, and means for establishing a direct drive between said shafts, of shiftable means for operating said gearing to attain said drives, including a cylinder adapted for connection with the intake manifold of a vehicle engine, a piston operating in said cylinder, a selective means for establishing communication between said cylinder and the engine manifold on one side or the other of said piston to cause said piston to move in one direction or the other in accordance with the modification of subatmospheric pressure created in the engine manifold to shift said transmission to establish the selected drive, and secondary means movable with said piston to establish a connection between said cylinder and the engine manifold on both sides of said piston after the shift has taken place for restoring the parts to equilibrium.

13. The combination with a transmission having a gearing for establishing a different drive ratio between a driving and a driven shaft of a vehicle and for establishing a direct drive between the shafts, of means for shifting said gearing including a cylinder adapted for connection with the intake manifold of the vehicle engine, a valve selectively movable to establish connection between said cylinder on one or the other side of said piston with the intake manifold of the engine, and a second valve movable with said piston for restoring connection between said cylinder on both sides of the piston after the piston has been moved to the pre-selected position.

14. The combination with a transmission including gearing for establishing a different drive ratio between the driving and driven shafts of a vehicle, of means for shifting said transmission to establish a different gear ratio drive or a direct drive between the driving and driven shafts including a cylinder, a piston operating in said cylinder, a sleeve valve movable to pre-selective positions for connecting said cylinder on one side or the other of said piston with the intake manifold of the engine, and a piston valve cooperating with said sleeve valve and movable with said piston for re-establishing a connection between the intake manifold of the engine and said cylinder on both sides of said piston.

15. The combination with a transmission including a gearing for establishing a different speed ratio drive between the driving and driven shafts of a vehicle, and for establishing a direct drive between said shafts, of means for shifting said gearing for establishing said drives comprising a piston, a cylinder operating in said piston, a valve casing having a port communicating with the intake manifold of the vehicle engine and ports communicating with said cylinder on opposite sides of said piston, a sleeve valve operating in said valve casing and selectively moved to place said manifold port into communication with either of said cylinder ports, and a piston valve operating in said sleeve valve and movable with the piston for restoring communication between said manifold port and both ports of said cylinder after the piston has been moved to a predetermined position.

16. In a transmission, the combination with a driving shaft, a driven shaft, a planetary gearing for operating said driven shaft at a greater speed than said driving shaft, said gearing including a sun gear, means normally holding said sun gear against rotation, an automatic centrifugally operated clutch for establishing a drive between said driving and driven shafts through said gearing, and means for releasing said sun gear holding means to permit a direct drive between said driving and driven shafts without disconnecting said automatic clutch.

17. In a transmission, the combination with a driving shaft and a driven shaft, of a planetary gearing for establishing an overspeed drive between said shafts including a sun gear, means for holding said sun gear against rotation, an automatic centrifugally operated clutch for connecting said driving and driven shafts through said gearing under certain predetermined conditions, and means for releasing said holding means for said sun gear without disconnecting said centrifugal clutch to permit the sun gear to rotate whereby a one-to-one ratio drive will be established between said shafts without disconnecting said automatic clutch.

18. In a transmission, the combination with a driving and a driven shaft, of a planetary gearing for establishing a variable ratio drive between said shafts comprising a ring gear drivingly connected with a driven shaft, a sun gear, means for locking said sun gear to a stationary part to hold the same against substantial rotation, planet pinions, a centrifugally operated automatic clutch for connecting said pinion carrier with the drive shaft to establish a change speed drive between said shafts through said gearing, and means for releasing said sun gear locking means to permit the sun gear to rotate freely to establish a one-to-one drive between said shafts through said gearing without disconnecting said automatic clutch.

19. In a driving system for automotive vehicles having an engine throttle control member, the combination with a driving shaft and a driven shaft, of speed changing gearing, centrifugal control means for effecting a drive between said shafts through said gearing when the speed of the vehicle reaches a predetermined point and establishing a direct drive between said shafts when the speed of the shafts falls below the predetermined point, and means operated by the movement of the throttle control member in open direction to operate said gearing to establish a direct drive between said shafts with the speed of the vehicle above the direct drive point of said centrifugally operated means without affecting said centrifugal control means.

20. In a driving system for automotive vehicles having an engine throttle control member, the combination with a driving shaft and a driven shaft, of speed changing gearing including a planetary gear having a sun gear, means for holding said sun gear against rotation, automatic clutch means centrifugally operated for effecting a drive between said driving and driven shafts through said planetary gearing when the speed of the vehicle reaches a predetermined point, and means operated by the engine throttle control member for releasing said sun gear holding means to establish a direct drive between said shafts without disengaging said automatic clutch.

21. In a driving system for an automotive vehicle having an engine throttle controlling member, the combination with driving and driven shafts, of change speed means for driving said driven shaft at the same speed as the driving shaft or at an overdriving speed, means for establishing an overdriving speed between said shafts through said change speed means and means operated by the combined movement of said throttle control member first in a closing direction and then suddenly in an opening direction to operate said gearing to effect a shift from said overdrive speed to a direct drive between said shafts and means associated with said throttle control member for preventing said shift upon a gradual movement of the throttle member in an opening direction.

22. In a driving system for automotive vehicles having an engine throttle control member, the combination with driving and driven shafts, of a change speed gearing for driving said driven shaft at the same speed as that of the driving shaft or at an overdriving speed, means for establishing an overspeed drive of said driven shaft through said gearing, means dependent upon the movement of the throttle control member in a closing direction and then the speed of movement of the throttle control member in an open direction for operating said gearing to establish a direct drive between said shafts and means associated with said throttle control member for preventing the operation of said gearing by a gradual movement of the throttle control member in an opening direction.

23. In a driving system for automotive vehicles having an engine throttle controlling member, the combination with driving and driven shafts, of a planetary gearing associated with said shafts for establishing an overspeed drive of the driving shaft from said driven shaft, said planetary gearing including a sun gear, a brake having one member thereof rotatively stationarily mounted for holding said sun gear against rotation, the members of said brake being releasable only under substantially no-load conditions, means for establishing substantially no-load conditions on said brake when said throttle member is moved in closed direction, and means operated by said throttle controlling member when the same is suddenly moved in opening direction after the establishment of said substantially no-load conditions for releasing said brake.

24. In a driving system for automotive vehicles having an engine throttle control member, the combination with a driving shaft and a driven shaft, of a planetary speed changing gearing associated with said shafts for establishing variable speed ratios between said shafts, manually operated means for selectively effecting a speed change drive through said speed changing gearing between said shafts, and means dependent upon the speed of movement of said throttle control member in open direction for effecting a shift in said gearing to establish another speed ratio drive through said gearing between said shafts.

25. In a driving system for automotive vehicles having an engine throttle control member, the combination with a driving shaft and a driven shaft, of a planetary speed changing gearing associated with said shafts for establishing a variable speed ratio drive between said shafts, means for selectively effecting a change speed drive between said shafts through said gearing, and means dependent upon the speed of movement of said throttle control member in open direction for effecting a shift in said gearing to establish a direct drive between said shafts.

26. In a driving system for automotive vehicles having an engine throttle control member, the combination with a driving shaft and a driven shaft, of a planetary gearing associated with said shafts for establishing a variable speed ratio drive between said shafts, means dependent upon the speed of movement of said throttle control member in an open direction for effecting a shift in said gearing to establish a drive through said gearing between said shafts and means for preventing a shift of said gearing by the gradual movement of said throttle control member in an open direction.

27. The combination with a driving shaft and a driven shaft, of a speed changing gearing including a planetary gear having a sun gear associated with said shafts for establishing a variable speed ratio drive between said shafts and including a sun gear, a brake, having one member rotatively stationarily mounted and the other member associated with said sun gear for holding said sun gear against rotation, the members of said brake being engageable only when they approach synchronism, automatic clutch means centrifugally operated for effecting a drive between said driving and driven shafts through said planetary gearing when the speed of the vehicle reaches a predetermined point, and means within the control of the operator for operating said sun gear holding brake to release said sun gear and permit a rotation thereof to establish a one-to-one drive between said shafts.

28. In a driving system for automotive vehicles having an engine throttle control member, the combination with a driving shaft and a driven shaft, of a planetary gearing for driving said driven shaft at an overspeed drive from said driving shaft and including a normally stationary sun gear, a pinion gear and a ring gear, clutch means for connecting one of said second two mentioned gears to one of said shafts for effecting a driving connection between the driving shaft and the driven shaft through said gearing, and means operated by said throttle control member for changing said sun gear from a stationary to a rotating gear to effect a one-to-one drive between said shafts without disconnecting said clutch means.

29. In a driving system for automotive vehicles having an engine throttle control member, the combination with a driving shaft and a driven shaft, of a planetary gearing for effecting relatively higher speed drive of said driven shaft from said driving shaft including a sun gear, a planet gear and a ring gear, brake means for holding said sun gear normally against rotation, a centrifugally operated clutch member for connecting one of the other of said gears to one of said shafts for effecting the relatively higher speed drive of said driven shaft from said driving shaft, and means operated by said throttle control member for releasing said brake means without disconnecting said clutch for effecting a relatively lower speed drive between said shafts.

30. In a driving system for automotive vehicles having an engine throttle control member, the combination with a driving shaft and a driven shaft, of a planetary gearing for effecting an overspeed drive of said driven shaft from said driving shaft including a sun gear, planet gears having a planet carrier and a ring gear, clutch means for connecting said planet carrier to said driving shaft for effecting a relatively higher speed drive of said driven shaft from said driving shaft, holding means for normally preventing said sun gear from rotation and means operated by the throttle control member for releasing said holding means without disconnecting said clutch means for effecting a relatively lower speed drive between said shafts.

31. The combination with a driving shaft and a driven shaft, of a planetary gearing for effecting an overspeed drive between said driving and driven shafts including a sun gear, a planet gear and a ring gear, holding means for said sun gear comprising a member connected to said sun gear and having a plurality of peripheral notches and a radially movable dog rotatably stationarily connected to a stationary part and radially movable into and out of engagement with said notches, clutch means for connecting one of the other of said gears to one of said shafts for effecting a relatively higher speed drive, and means for radially moving said dog out of an engaging notch to permit rotative movement of said sun gear for effecting a relatively lower speed drive between said shafts without disconnecting said clutch means.

32. The combination with a driving and a driven shaft, of a planetary gearing for effecting an overspeed drive of said driven shaft from said driving shaft including a sun gear, a planet gear and a ring gear, means for holding said sun gear normally against rotative movement including a holding member connected to the sun gear having peripheral notches therein and a radially movable dog rotatably stationarily mounted relatively to said sun gear and movable into and out of engagement with said notches, a centrifugally operated clutch for connecting one of the other of said gears to one of said shafts for effecting a relatively higher speed drive of said driven shaft from said driving shaft, and means for radially moving said dog out of said notches to effect a relatively lower speed drive between said shafts without disconnecting said clutch means.

33. In a transmission, in combination, a driving shaft, a driven shaft, a planetary gearing for operating said driven shaft at a greater speed than said driving shafts, said gearing including a sun gear, means normally holding said sun gear against rotation, an automatic centrifugally operated clutch for establishing a drive between said driving and driven shafts through said gear, and electromagnetic means for releasing said sun gear holding means to permit a relatively lower speed drive between said driving and driven shafts without disconnecting said automatic clutch.

34. In a transmission, in combination, a driving shaft, a driven shaft, a planetary gearing for operating said driven shaft at a greater speed than said driving shaft, said gearing including a sun gear, means normally holding said sun gear against rotation, an automatic centrifugally operated clutch for establishing a drive between said driving and driven shafts through said gearing, and a solenoid for effecting a release of said sun gear holding means to permit a relatively lower speed drive between said driving and driven shafts without disconnecting said automatic clutch.

35. In a driving system for automotive vehicles, having an engine throttle control member, the combination with a driving shaft, a driven shaft, a planetary gearing for operating said driven shaft at a greater speed than said driving shaft, said gearing including a sun gear means normally holding said sun gear against rotation, an automatic centrifugally operated clutch for establishing a drive between said driving and driven shafts through said gearing, electro-magnetic means for effecting a release of said sun gear holding means to permit a relatively lower speed drive between said driving and driven shafts without disconnecting said automatic clutch, and means operated by the movement of said throttle control member in open throttle direction for operating said electro-magnetic means.

36. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including interengaging parts releasable under substantially no-load conditions, and single control means affecting the establishment of no-load conditions on said brake, and effecting a release of said brake when said no-load conditions exist.

37. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including interengaging parts releasable under substantially no-load conditions, mechanical means for releasing said brake when said no-load conditions exist, and single control means for effecting the establishment of no-load conditions on said brake and for effecting the operation of said mechanical means.

38. The combination with a driving and a driven shaft, of one-way engaging means for establishing a drive between said shafts, a planetary gearing associated with said shafts for establishing a different speed drive between said shafts, a brake having interengaging members releasable under substantially no-load conditions for holding one member of said sun gear stationary for establishing driving conditions in said gearing including inter-engaging parts releasable under substantially no-load conditions, means for establishing no-load conditions on said brake, and electro-magnetic means for effecting a release of said brake when said no-load conditions exist.

39. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including inter-engaging parts releasable under substantially no-load conditions, means for establishing no-load conditions on said brake, and subatmospheric means for effecting a movement of said brake in one direction.

40. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including inter-engaging parts releasable under substantially no-load conditions, means for biasing said inter-engaging parts toward disengagement subatmospheric pressure operated means for normally opposing said bias, and means for reducing said subatmospheric pressure and for establishing no-load conditions on said brake to release said brake.

41. The combination with a driving and a driven shaft, of one-way engaging means for establishing a drive between said shafts, a planetary gearing associated with said shafts for establishing a different speed drive between said shafts and including a sun gear, a brake having interengaging members releasable under substantially no-load conditions for holding the sun gear against rotation to establish driving conditions in said gearing, a single control means for establishing no-load conditions on said brake, and for effecting a release of said brake when said no-load conditions are established.

42. The combination with a driving and a driven shaft, of one-way engaging means for establishing a drive between said shafts, a planetary gearing associated with said shafts for establishing a different speed drive between said shafts and including a sun gear, a brake having interengaging members releasable under substantially no-load conditions for holding said sun gear against rotation to render said gearing drivingly operative, mechanical means for releasing said brake when said no-load conditions are established and a single control means for establishing no-load conditions on said brake and for effecting the operation of said mechanical means.

43. The combination with a driving and a driven shaft, of one-way engaging means for establishing a drive between said shafts, a planetary gearing associated with said shafts for establishing a different speed drive between said shafts and including a sun gear, a brake having interengaging members releasable under substantially no-load conditions for holding said sun gear against rotation to render said gearing drivingly operable, means for establishing no-load conditions on said brake and electro-magnetic means for effecting a release of said brake when said no-load conditions are established.

44. The combination with a driving and a driven shaft, of one-way engaging means for establishing a drive between said shafts, a planetary gearing associated with said shafts for establishing a different speed drive between said shafts and including a sun gear, a brake having interengaging members releasable under substantially no-load conditions for holding said sun gear against rotation to render said gearing drivingly operable, means for establishing no-load conditions on said brake, and subatmospheric means for effecting a movement of said brake in one direction.

45. The combination with a driving shaft and a driven shaft, of one-way engaging means for establishing a drive between said shafts, a planetary gearing associated with said shafts for establishing a different speed drive between said shafts and including a sun gear, a brake having interengaging members releasable under substantially no-load conditions for holding said sun gear against rotation to render said gearing drivingly operative, means biasing said interengaging parts toward disengagement, subatmospheric operated means normally opposing said bias, and a single control means for effecting a reduction of said subatmospheric pressure and for effecting an establishment of no-load conditions on said brake to effect a release of said brake.

46. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including a radially movable rotatably stationary dog releasable under substantially no-load conditions, means for establishing no-load conditions on said dog, and means for radially moving said dog into released position upon the establishment of said no-load conditions.

47. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including a radially movable rotatably stationary dog releasable under substantially no-load conditions, means for establishing no-load conditions on said dog, and electro-magnetic means for effecting a radial movement of said dog into released position when said no-load conditions are established.

48. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including a radially movable rotatably stationary dog releasable under substantially no-load conditions, means for establishing no-load conditions on said dog, and subatmospheric means for effecting movement of said dog in one direction.

49. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including a radially movable rotatably stationary dog releasable under substantially no-load conditions, means biasing said dog into disengaging position, subatmospheric pressure means normally opposing said bias, and means for reducing said subatmospheric pressure and for establishing no-load conditions on said dog for effecting the release of said brake.

50. The combination with a driving and a driven shaft, of one-way engaging means for establishing a drive between said shafts, a planetary gearing associated with said shafts for establishing a different speed drive between said shafts, a brake for holding one member of said gearing stationary for establishing driving conditions in said gearing including a radially movable rotatably stationary dog releasable under substantially no-load conditions, means for establishing no-load conditions on said dog, and mechanical means for moving said dog to released position when said no-load conditions are established.

51. The combination with a driving and a driven shaft, of one-way engaging means for establishing a drive between said shafts, a planetary gearing associated with said shafts for establishing a different speed drive between said shafts and including a sun gear, a brake for holding said sun gear against rotation to render said gearing drivingly operable and including a rotatably stationary radially movable dog releasable under substantially no-load conditions, means for establishing no-load conditions on said dog, and means for radially moving said dog into released position when said no-load conditions are established.

52. The combination with a driving and a driven shaft, of one-way engaging means for establishing a drive between said shafts, a planetary gearing associated with said shafts for establishing a different speed drive between said shafts and including a sun gear, a brake for holding said sun gear against rotation to render said gearing drivingly operable and including a radially movable rotatably stationary dog releasable under substantially no-load conditions, and mechanical means for moving said dog radially into released position when said no-load conditions are established.

53. The combination with a driving and a driven shaft, of one-way engaging means for establishing a drive between said shafts, a planetary gearing associated with said shafts for establishing a different speed drive between said shafts and including a sun gear, a brake for holding said sun gear against rotation to render said gearing drivingly operable and including a radially movable rotatably stationary dog releasable under substantially no-load conditions, means for establishing no-load conditions on said dog, and electromagnetic means for effecting a radial movement of said dog into released position when said no-load conditions are established.

54. The combination with a driving and a driven shaft, of one-way engaging means for establishing a drive between said shafts, a planetary gearing associated with said shafts for establishing a different speed drive between said shafts and including a sun gear, a brake for holding said sun gear against rotation to render said gearing drivingly operable and including a radially movable rotatably stationary dog releasable under substantially no-load conditions, means for establishing no-load conditions on said dog, and subatmospheric means for effecting the movement of said dog in one direction.

55. The combination with a driving and a driven shaft, of one-way engaging means for establishing a drive between said shafts, a planetary gearing associated with said shaft for establishing a different speed drive between said shafts and including a sun gear, a brake for holding said sun gear against rotation to render said gearing drivingly operable and including a radially movable rotatably stationary dog releasable under substantially no-load conditions, means biasing said dog toward disengaging position, subatmospheric pressure operated means normally opposing said bias, and means for reducing said subatmospheric pressure and for establishing no load conditions on said dog to release said dog.

56. The combination with a driving and a driven shaft, of a planetary gearing associated with said shafts for establishing a drive between said shafts through said gearing, a brake for holding one member of said gearing stationary for establishing driving conditions in said gearing including interengaging parts releasable under substantially no-load conditions, a single control means for effecting the establishment of no-load conditions on said brake, and effecting the release of said brake when said no-load conditions exist to render said gearing drivingly inoperable.

57. The combination with a driving and a driven shaft, of a planetary gearing associated with said shafts for drivingly connecting one of said shafts with the other, a brake for holding one member of said gearing stationary for rendering said planetary gearing drivingly operative and including interengaging parts releasable under substantially no-load conditions, mechanical means for releasing said brake when said no-load conditions exist and a single control means for effecting the establishment of no-load conditions and the operation of said mechanical means.

58. The combination with a driving and a driven shaft, of a planetary gearing associated with said shafts for drivingly connecting said shafts, a brake for holding one member of said gearing stationary for establishing driving conditions in said gearing and including interengaging parts releasable under substantially no-load conditions, means for establishing no-load conditions on said brake, and electro-magnetic means for effecting a release of said brake when said no-load conditions are established.

59. The combination with a driving and a driven shaft, of a planetary gearing associated with said shafts for drivingly connecting said shafts, a brake for holding one member of said gearing stationary for rendering the same drivingly operable and including interengaging parts releasable under substantially no-load conditions, means for establishing no-load conditions on said brake, and subatmospheric means for effecting a movement of said dog in one direction.

60. In a driving system for an automotive vehicle having an engine throttle controlling member, the combination with a driving and a driven shaft, of a change speed gearing of the planetary type associated with said shafts and including a sun gear, means for establishing a change speed gear drive between said shafts through said gearing, a brake having one member thereof held against rotation for holding said sun gear against rotation, said brake being releasable under substantially no-load conditions, and means operated by the movement of the throttle control member in an open direction for disengaging said brake after said no load conditions have been effected on said brake.

61. In a driving system for automotive vehicles, having an engine throttle control member, the combination with driving and driven shafts, of a planetary gearing associated with said shafts for establishing a drive between said shafts and including a sun gear, a brake having one member rotatively stationarily mounted for holding said sun gear against rotation, said brake being releasable only under substantially no load conditions, and means controlled by said throttle control member for releasing said brake during said substantially no load conditions for permitting a free rotation of said sun gear.

62. In a driving system for automotive vehicles, having an engine throttle control member, the combination with a driving shaft and a driven shaft, of a planetary gearing for establishing a drive between said driving and driven shafts including a sun gear, releasable means for holding said sun gear against rotation to drive said driven shaft from the driving shaft through said planetary gearing, said means being releasable only under substantially no load conditions, and means controlled by said throttle control member for releasing said holding means after the establishment of said substantially no load conditions and prior to the reestablishment of load conditions.

63. In a driving system for automotive vehicles, the combination with a driving shaft and a driven shaft, of a planetary gearing associated with said shafts for driving said driven shaft at a different speed from that of the driving shaft and including as one element thereof a sun gear, holding means for holding said sun gear against rotation, said holding means being releasable only under substantially no load conditions, means establishing, when said holding means is released, a one-to-one drive between said driving and driven shafts, means for operating said holding means to release the same under said substantially no load conditions, and a single control means for removing the driving torque from said driving shaft to establish said substantially no load conditions on the sun gear holding means prior to release of said sun gear holding means and for effecting the operation of said operating means.

64. A driving system for automotive vehicles, the combination with a driving shaft and a driven shaft, of a planetary gearing associated with said shafts for driving said driven shaft at a different speed from that of the driving shaft and including as one element thereof a sun gear, said sun gear having non-rotatably associated therewith a holding disc provided with a peripheral notch, a radially movable non-rotatably mounted dog adapted to cooperate with said notch for preventing rotative movement of said sun gear, said dog, when in engaged position, being radially movable only when there is substantially no driving load imposed on said holding disc and means within the control of the operator for removing the torque drive from said driving shaft to establish substantially no load conditions on said holding disc prior to the radial movement of said dog.

65. In a driving system for automotive vehicles, the combination with a driving shaft and a driven shaft, of a planetary gearing associated with said shafts for driving said driven shaft at a different speed from that of the driving shaft and including as an element thereof a sun gear, releasable holding means for holding said sun gear against rotation, said holding means being releasable only under substantially no load conditions, means for establishing another speed drive between said driving and driven shafts when said holding means is released, means for removing the driving torque on said driving shaft to establish substantially no load conditions on said holding means prior to the moving of said holding means to released position, and a solenoid for effecting a movement of said holding means to released position when substantially no-load conditions are established on said holding means.

66. In a driving system for automotive vehicles having an engine throttle control member, the combination with a driving shaft and a driven shaft, of a planetary gearing associated with said shafts for driving said driven shaft at a speed different from that of the driving shaft and including as an element thereof a sun gear, releasable holding means for holding said sun gear against rotation, said holding means being releasable only under substantially no load conditions and, when released, establishing a drive between said driving and driven shafts other than through said gearing, an electro-magnet for effecting a movement of said holding means to released position, said throttle member being movable to establish no-load conditions on said driving shaft and to control the operation of said solenoid.

67. In a driving system for automotive vehicles having a throttle control member, the combination with a driving shaft and a driven shaft, a planetary gearing associated with said shafts for driving said driven shaft at a speed different from that of the driving shaft and including as an element thereof a sun gear, a rotatably-stationary radially-movable dog for holding said sun gear against rotation and movable to a released position only under substantially no-load conditions and when so released establishing a drive between said shafts different than that through said planetary gearing, a solenoid for effecting a movement of said dog to its released position, and means operated by the movement of said throttle control member in open throttle direction for causing the operation of said solenoid.

68. In a speed-changing gear for vehicles, the combination with a driving shaft, of a shaft to be driven from said driving shaft, a free-wheel clutch for operatively connecting said shafts to provide one speed ratio, a gear mechanism connecting said shafts capable of planetary movement and provided with a driving connection to bridge the free-wheel clutch for providing a higher speed ratio, a shiftable clutch member for connecting an element of said overdrive gear mechanism with said driving shaft, a brake for holding one member of the overdrive mechanism rotatably stationary to establish driving conditions in said gearing and including inter-engaging parts releasable under no-load conditions, means for establishing no-load conditions on said brake, and means for releasing said brake when said no-load conditions exist.

69. In a speed-changing gear for vehicles, the combination with a driving shaft, of a shaft to be driven from said driving shaft, a free wheel clutch for operatively connecting said shafts to provide a one speed ratio, a gear mechanism for connecting said shafts including a sun gear and capable of planetary movement and provided with driving connections to bridge the free-wheel clutch for providing a higher speed ratio, a shiftable clutch member for connecting an element of said overdrive gear mechanism with said driving shaft, a brake for holding said sun gear rotatably stationary to establish driving conditions in said gearing and including inter-engaging parts releasable under no-load conditions, means for establishing no-load conditions on said brake, and means for releasing said brake when said no-load conditions exist.

70. In a speed-changing gear for vehicles, the combination with a driving shaft, of a shaft to be driven from said driving shaft, a free-wheel clutch for operatively connecting said shaft to provide one speed ratio, a gear mechanism for connecting said shafts capable of planetary movement and provided with driving connections to bridge the free-wheel clutch for providing a higher speed ratio, a shiftable clutch member for connecting an element of said overdrive gear mechanism with said driving shaft, a brake for holding one member of the overdrive mechanism rotatably stationary to establish driving conditions in said gearing and including inter-engaging parts releasable under no-load conditions and a single control element for effecting an establishment of no-load conditions on said brake and for effecting the release of said brake when said no-load conditions exist.

71. In a speed-changing gear for vehicles, the combination with a driving shaft, of a shaft to be driven from said driving shaft, a free-wheel clutch for operatively connecting said shafts to provide one speed ratio, a gear mechanism for connecting said shafts including a sun gear and capable of planetary movement and provided with driving connections to bridge the free wheel clutch for providing a higher speed ratio, a shiftable clutch member for connecting an element of said overdrive gear mechanism with said driving shaft, a brake for holding said sun gear rotatably stationary and including inter-engaging parts releasable under substantially no-load conditions, a single control element for effecting no-load conditions on said brake and for effecting a release of said brake when said no-load conditions exist.

72. In a power transmission for driving a motor vehicle having an engine provided with a throttle valve, a driving shaft adapted to receive drive from the engine, a driven shaft adapted to drive the vehicle, means for driving the driven shaft from and at the same speed as the driving shaft, means including a clutch engageable to effect overdrive of the vehicle from the driving shaft, driver operated means for adjusting the engine throttle valve and drive control means operable in response to operation of said throttle valve adjusting means for selectively effecting operation of said driving means and said overdriving means without disengaging said clutch, said drive control means including an electrically controlled prime mover.

73. In a power transmission for driving a motor vehicle having an internal combustion engine and a driver manipulated throttle control, a driving shaft adapted to receive drive from the engine and a driven shaft adapted to drive from said driving shaft, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation and means for selectively controlling operation of said holding means with respect to said control gear, said means including a solenoid for effecting release of said holding means.

74. In a power transmission for driving a motor vehicle having an internal combustion engine and a driver manipulated throttle control, a driving shaft adapted to receive drive from the engine and a driven shaft adapted to drive from said driving shaft, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation, means including a solenoid for selectively controlling the operation of said holding means, means for controlling energization of said solenoid in response to manipulation of said throttle control, and means operable upon energization of said solenoid for releasing said holding means.

75. In a motor vehicle power transmission having a driving shaft adapted to receive drive from a prime mover and a driven shaft adapted to be driven from said driving shaft, planetary gearing operable between said shafts for driving the driven shaft from the driving shaft, said gearing including a rotatable control gear adapted to be held for rotation to provide said drive and to be released for rotation to release said drive, holding means selectively operable to hold said control gear against rotation or to release said gear for rotation, mechanism for selectively controlling engagement and disengagement of said holding means, said mechanism including an electrically controlled prime mover operator for controlling release of said holding means, vehicle driver operable means for controlling operation of said prime mover, and means responsive to operation of said prime mover for releasing said holding means.

76. In a power transmission for driving a motor vehicle having an internal combustion engine and a driver operable engine throttle control, a driving shaft adapted to receive drive from the engine and a driven shaft adapted to drive the vehicle, relatively slow speed driving means for driving the driven shaft from the driving shaft, relatively fast speed driving means for driving the driven shaft from the driving shaft at a speed faster than that provided by said slow speed driving means including positively engageable drive control elements operably associated therewith and adapted when engaged to establish said relatively fast speed drive, said elements when engaged being subjected to thrust transmission therebetween during said relatively fast speed drive so as to resist disengagement of said elements to release this drive until the drive torque in said transmission is reversed, said relatively slow speed driving means including a control device operating automatically to establish this drive in response to release of said relatively fast speed driving means, solenoid operating means adapted to effect disengagement of said elements thereby to release said relatively fast speed driving means, said throttle control effecting operation of said solenoid operating means and reversing the drive torque in said transmission, thereby to step down the drive through the transmission by effecting release of said relatively fast speed driving means and operation of said relatively slow speed driving means.

77. In a power transmission for driving a motor vehicle having an internal combustion engine and a driver operable control means, a driving shaft adapted to receive drive from the engine and a driven shaft adapted to drive the vehicle, relatively slow speed driving means for driving the driven shaft from the driving shaft, relatively fast speed driving means for driving the driven shaft from the driving shaft at a speed faster than that provided by slow speed driving means including positively engageable drive control elements operably associated therewith and adapted when engaged to establish said relatively fast speed drive, said elements when engaged being subjected to thrust transmission therebetween during said relatively fast speed drive so as to resist disengagement of said elements to release this drive until the thrust transmission therebetween is relieved, said relatively slow speed driving means including a control device operating automatically to establish this drive in response to release of said relatively fast speed driving means, solenoid operating means adapted to effect disengagement of said elements thereby to release said relatively fast speed driving means, said control means effecting operation of said solenoid operating means and relieving the thrust transmission between said elements thereby to step down the drive through the transmission by effecting release of said relatively fast speed driving means and operation of said relatively slow speed driving means.

78. In a drive for motor vehicles having an engine provided with a driver operated engine throttle control, transmission mechanism operable to provide a drive from the engine to the vehicle, said mechanism including positively engageable drive control elements adapted when engaged to establish said drive, said elements when engaged being subjected to thrust transmission therebetween during said drive so as to resist disengagement of said elements to release the drive until the thrust transmission therebetween is relieved, solenoid operating means adapted to effect disengagement of said elements thereby to release said drive, the driver operation of said throttle control effecting operation of said solenoid operating means and relieving said thrust transmission.

79. In a drive for a motor vehicle having an engine provided with a driver operated engine throttle control operable throughout a range of movement and adjusting the throttle valve between its fully opened and closed positions, transmission mechanism operable to provide a drive from the engine to the vehicle, said mechanism including positively engageable drive control elements adapted when engaged to establish said drive, said elements when engaged being subjected to thrust transmission therebetween during said drive so as to resist disengagement of said elements to release the drive until the thrust transmission therebetween is relieved, solenoid operating means adapted to effect disengagement of said elements thereby to release said drive, and means operating in response to driver operation of said throttle control at the end of the open range of movement of the throttle valve for effecting operation of said solenoid operating means.

80. In a drive for a motor vehicle having an engine and driver operated control means, transmission mechanism operable to provide a drive from the engine to the vehicle, said mechanism including positively engageable drive control elements adapted when engaged to establish said drive, said elements when engaged being subjected to thrust transmission therebetween during said drive so as to resist disengagement of said elements to release the drive until the thrust therebetween is relieved, solenoid operating means adapted to effect disengagement of said elements thereby to release said drive, the operation of said driver operated control means effecting operation of said solenoid operating means and relieving said thrust transmission.

81. In a power transmission for driving a motor vehicle having an internal combustion engine and a driver manipulated throttle control, a driving shaft adapted to receive drive from the engine and a driven shaft adapted to drive from said driving shaft, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation, and means selectively controlling operation of said holding means with respect to said control gear, said means including a solenoid for controlling operation of said holding means.

82. In a power transmission for driving a motor vehicle having an internal combustion engine and a driver manipulated throttle control, a driving shaft adapted to receive drive from the engine and a driven shaft adapted to drive from said driving shaft, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation, means for selectively controlling operation of said holding means with respect to said control gear, said means including a solenoid for controlling operation of said holding means, and means operable in response to manipulation of said throttle control for controlling energization of said solenoid.

83. In a power transmission for driving a motor vehicle having an internal combustion engine and a driver operable engine throttle control, a driving shaft adapted to receive drive from the engine and a driven shaft adapted to drive the vehicle, relatively slow speed driving means for driving the driven shaft from the driving shaft, relatively fast speed driving means for driving the driven shaft from the driving shaft at a speed faster than that provided by said slow speed driving means including positively engageable drive control elements operably associated therewith and adapted when engaged to establish said relatively fast speed drive, one of said drive control elements being movable relatively to the other to establish and release said relatively fast speed drive, said elements when engaged being subjected to thrust transmission therebetween during said relatively fast speed drive so as to resist disengagement of said elements to release this drive until the power delivery of the engine is momentarily interrupted, said relatively slow speed driving means including a control device operating automatically to esablish this drive in response to release of said relatively fast speed driving means, solenoid operating means adapted to move said relatively movable drive control element for controlling operation of said relatively fast speed driving means, means yieldingly opposing movement of said relatively movable drive control element by said solenoid operating means, the driver operation of said throttle control controlling operation of said solenoid operating means and momentarily interrupting the power delivery of said engine thereby to step down the drive through the transmission by effecting release of said relatively fast speed driving means and operation of said relatively slow speed driving means.

84. In a power transmission for driving a motor vehicle having an internal combustion engine and a driver manipulated throttle control, a driving shaft adapted to receive drive from the engine and a driven shaft adapted to drive from said driving shaft, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation, means for selectively controlling operation of said holding means with respect to said control gear, said means including a solenoid for effecting release of said holding means, and means operable in response to manipulation of said throttle control for controlling energization of said solenoid.

85. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; driver operated means for adjusting the engine throttle valve; and drive control means operable in response to operation of said throttle valve adjusting means in closing and opening the throttle valve for rendering said different speed drive inoperative.

86. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; driver operated means for adjusting the engine throttle valve; and drive control means operable in response to operation of said throttle valve adjusting means for selectively rendering said different speed drive either inoperative or operative, said clutch members being and remaining engaged during said selective operation of said drive control means.

87. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; means limiting clutching engagement of said clutching members to substantially synchronous rotation of said clutching members; means releasably driving the driven shaft from the driving shaft independently of said speed responsive clutch means, said clutching members being driven at relatively different speeds during operation of said releasable driving means; driver operated means for adjusting the engine throttle valve; and drive control means operable in response to operation of said throttle valve adjusting means for rendering said different speed drive inoperative while maintaining clutching engagement of said clutching members.

88. In a power transmission for driving a motor vehicle having an engine provided with a throttle valve; a driving shaft adapted to receive drive from the engine; a driven shaft adapted to drive the vehicle; an automatically operating clutch; means for driving the driven shaft from the driving shaft independently of said clutch at a relatively slow speed releasable to accommodate a further drive from the driving shaft to the driven shaft through said clutch relatively faster than said relatively slow speed drive; means for driving the driven shaft from the driving shaft at said relatively fast speed drive; said fast driving means including said clutch operable to control the drive through said fast driving means; driver operated means for adjusting the engine throttle valve; and drive control means operable in response to operation of said throttle valve adjusting means for selectively effecting operation of said relatively slow and fast driving means without disengaging said clutch.

89. In a power transmission for driving a motor vehicle having an engine provided with a throttle valve; a driving shaft adapted to receive drive from the engine; a driven shaft adapted to drive the vehicle; means for driving the driven shaft from and at the same speed as that of the driving shaft; means including a clutch comprising clutch parts engageable to effect overdrive of the driven shaft from the driving shaft; means preventing engagement of said clutch until the clutch parts thereof are synchronized and until a predetermined speed of rotation of at least one of said shafts has been reached or exceeded; driver operated means for adjusting the engine throttle valve; and drive control means operable in response to operation of said throttle valve adjusting means for selectively effecting operation of said driving means and said overdriving means without disengaging said clutch.

90. In a power transmission for driving a motor vehicle having an engine provided with a throttle valve; driver operated means for adjusting the engine throttle valve; a driving shaft adapted to receive drive from the engine; a driven shaft adapted to drive the vehicle; means for releasably driving the driven shaft from the driving shaft; an automatically operating clutch comprising relatively engageable clutching members one of which is adapted for centrifugal force movement to engage the other, said clutching members being so constructed and arranged that their engagement is limited to substantially synchronous rotation thereof; means for driving one of said clutching members from one of said shafts during operation of said releasable drive; means for driving the other of said clutching members from the other of said shafts at a speed different from that of the first said clutching member during operation of said releasable drive; said driving means for said clutching members providing a drive through said clutch for driving said driven shaft from said driving shaft at a speed faster than that provided by said releasable driving means; and drive control means operable in response to operation of said throttle valve adjusting means for effecting release of said faster driving means without disengaging said clutch.

91. In a power transmission for driving a motor vehicle having an engine provided with a throttle valve; driver operated means for adjusting the engine throttle valve; a driving shaft adapted to receive drive from the engine; a driven shaft adapted to drive the vehicle; means for releasably driving the driven shaft from the driving shaft; an automatically operating clutch comprising relatively engageable clutching members one of which is adapted for centrifugal force movement to engage the other, said clutching members being so constructed and arranged that their engagement is limited to substantially synchronous rotation thereof; means for driving one of said clutching members from one of said shafts during operation of said releasable drive; means for driving the other of said clutching members from the other of said shafts at a speed different from that of the first said clutching member during operation of said releasable drive; said driving means for said clutching members providing a drive through said clutch for driving said driven shaft from said driving shaft at a speed faster than that provided by said releasable driving means; and drive control means operable in response to operation of said throttle valve adjusting means for selectively controlling operation of said releasable driving means and said faster driving means while maintaining engagement of said clutch.

92. In a power transmission for driving a motor vehicle having an engine provided with a throttle valve; a driving shaft adapted to receive drive from the engine; a driven shaft adapted to drive the vehicle; means operable to drive the driven shaft from the driving shaft, comprising a clutch including clutching members engageable to effect the drive through said driving means, and means preventing engagement of said members until their speeds are synchronized; driver operated means for adjusting the engine throttle; and means responsive to operation of said throttle adjusting means for releasing the drive through said driving means.

93. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; said gearing including a rotatable drive-reaction-taking element; releasable braking means operating to hold said element; driver operated means for adjusting the engine throttle valve; and means operable in response to operation of said throttle valve adjusting means for effecting release of said braking means.

94. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; means limiting clutching engagement of said clutching members to substantially synchronous rotation of said clutching members; means releasably driving the driven shaft from the driving shaft independently of said speed responsive clutch means, said clutching members being driven at relatively different speeds during operation of said releasable driving means; said gearing including a rotatable drive-reaction-taking element; releasable braking means operating to hold said element; driver operated means for adjusting the engine throttle valve; and means operable in response to operation of said throttle valve adjusting means for effecting release of said braking means.

95. In an overdrive for motor vehicles having an engine throttle-controlling accelerator pedal operable by the vehicle driver, a driving shaft, a driven shaft, planetary gearing operably connecting said shafts for driving said driven shaft from and at a speed greater than said driving shaft, said planetary gearing including a sun gear, means including driving and driven members respectively drivingly connected to said driving and driven shafts for releasably driving said driven shaft from and at the same speed as the driving shaft, means for coupling said shafts for a two-way direct drive therebetween independently of said planetary gearing, braking means for said sun gear, fluid pressure operated means for actuating said braking means, and means operable in response to driver operation of said accelerator pedal releasing said fluid pressure operated means.

96. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; driver operated means for adjusting the engine throttle valve; and drive control means operable in response to operation of said throttle valve adjusting means for selectively rendering said different speed drive either inoperative or operative, said drive control means including a solenoid for rendering said different speed inoperative, said clutch members being engaged during said selective operation of said drive control means.

97. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting means comprising gearing for driving the driven shaft from the driving shaft at a speed different from that of the driving shaft when said clutching members are engaged; means limiting clutching engagement of said clutching members to substantially synchronous rotation of said clutching members; means releasably driving the driven shaft from the driving shaft independently of said speed responsive clutch means, said clutching members being driven at relatively different speeds during operation of said releasable driving means; driver operated means for adjusting the engine throttle valve; and drive control means including an electrically controlled prime mover operator operable in response to operation of said throttle valve adjusting means for rendering said different speed drive inoperative while maintaining clutching engagement of said clutching members.

98. In a power transmission for driving a motor vehicle having an engine provided with a throttle valve; driver operated means for adjusting the engine throttle valve; a driving shaft adapted to receive drive from the engine; a driven shaft adapted to drive the vehicle; means for releasably driving the driven shaft from the driving shaft; an automatically operating clutch comprising relatively engageable clutching members one of which is adapted for centrifugal force movement to engage the other, said clutching members being so constructed and arranged that their engagement is limited to substantially synchronous rotation thereof; means for driving one of said clutching members from one of said shafts during operation of said releasable drive; means for driving the other of said clutching members from the other of said shafts at a speed different from that of the first said clutching member during operation of said releasable drive; said driving means for said clutching members providing a drive through said clutch for driving said driven shaft from said driving shaft at a speed faster than that provided by said releasable driving means; and drive control means including a solenoid operable in response to operation of said throttle valve adjusting means for effecting release of said faster driving means without disengaging said clutch.

99. In an automotive device comprising a speed control pedal, a power input shaft, a power output shaft, planetary overdrive gearing between said shafts including a portion having radial slots therein, a radially movable pawl arranged to engage one of said radial slots whereby said planetary overdrive gearing is rendered operative for driving said output shaft at a speed greater than the speed of said input shaft, and a source of power, the improvement which consists in providing a servo-motor for controlling the radial movement of said pawl, and means operable by said control pedal for energizing said servo-motor by power from the source thereof and also for effecting de-energization thereof.

100. In a power transmission for driving a motor vehicle having an engine provided with a throttle valve, a driving shaft adapted to receive drive from the engine, a driven shaft adapted to drive the vehicle, means including one-way engaging means for effecting a drive from the driving to the driven shaft at one speed, means including a clutch comprising clutch parts engageable to effect a higher speed drive of said driven shaft from the driving shaft than that effected by said first-mentioned means, means preventing engagement of said clutch until a predetermined speed of rotation of at least one of said shafts has been reached or exceeded, driver operated means for adjusting the engine throttle valve, and drive control means operable in response to operation of said throttle valve adjusting means for selectively effecting operation of said driving means.

101. In a drive for motor vehicles having an engine provided with a throttle valve actuator, a driving shaft adapted to receive a drive from the engine, a driven shaft adapted to drive the vehicle, relatively slow speed driving means for driving the driven shaft from the driving shaft including automatically engaging means, relatively fast speed driving means for driving the driven shaft from the driving shaft including engageable members for controlling the drive through said relatively fast speed driving means and engageable when the throttle valve actuator is moved in closing direction and releasable to establish said relatively low speed drive, said clutching member being engageable only when the speed of at least one of said shafts reaches a predetermined point or above said predetermined point, said automatic engaging means establishing said low speed drive when said high speed drive is disconnected, and means for releasing said high speed drive controlled by said throttle valve actuator.

102. In a drive for motor vehicles having an engine provided with a throttle valve actuator operable by the driver, a driving shaft adapted to receive a drive from the engine, a driven shaft adapted to drive the vehicle, a relatively slow speed driving means for driving the driven shaft from the driving shaft including engaging means, relatively fast speed driving means for driving the driven shaft from the driving shaft including engageable members for controlling the drive through said high speed means, and engageable when the throttle valve actuator is moved in closing direction and releasable to establish said low speed drive, said engageable elements being engageable when the speed of one of said shafts reaches to or above a predetermined point, said first-mentioned engaging means establishing said low speed drive when said high speed drive is disconnected, and means for releasing said high speed drive when the throttle valve actuator is moved in open direction.

103. In a drive for motor vehicles having an engine provided with a throttle valve actuator, a driving shaft adapted to receive a drive from the engine, a driven shaft adapted to drive the vehicle, relatively slow speed driving means for driving the driven shaft from the driving shaft including automatic engageable means, relatively fast speed driving means for driving the driven shaft from the driving shaft including engageable members for controlling the drive through said high speed means and engageable when the throttle valve actuator is moved in closing direction and releasable to establish said low speed drive, said automatic engageable means establishing said low speed drive when said high speed is released, an electromagnetically controlled means for releasing said high speed drive when said throttle valve actuator is moved in open direction.

104. The combination with a driving and a driven shaft, of a one-way engaging means for effecting a drive between said shafts, a planetary gearing associated with said shafts for establishing a different speed drive in the same direction between said shafts, a brake for holding one member of said gearing stationary for establishing driving conditions in said gearing including positively interengaging parts releasable only under substantially no-load conditions, means for establishing no-load conditions on said brake, and fluid pressure means for effecting a movement of said brake in one direction.

105. The combination with a driving and a driven shaft, of a one-way engaging means for effecting a drive between said shafts, a planetary gearing associated with said shafts for establishing a different speed drive in the same direction between said shafts, a brake for holding one member of said gearing stationary for establishing driving conditions in said gearing including positively inter-engaging parts releasable under substantially no-load conditions, means for biasing said inter-engaging parts in one direction, fluid pressure operated means for moving at least one of said parts in the opposite direction, and means for controlling said fluid pressure.

106. The combination with a driving and a driven shaft, of one-way engaging means for establishing a drive between said shafts, a planetary gearing associated with said shafts for establishing a different speed drive in the same direction between said shafts and including a control gear, a brake having positively inter-engaging members releasable under substantially no-load conditions for holding said control gear against rotation to render said gearing drivingly operable, means for establishing no-load conditions on said brake, and fluid pressure means for effecting movement of said brake in one direction.

107. The combination with a driving and driven shaft, of one-way engaging means for establishing a drive between said shafts, a planetary gearing associated with said shafts for establishing a different speed drive in the same direction between said shafts, a brake for holding one member of said gearing stationary for establishing driving conditions in said gearing including a radially movable rotatively stationary dog releasable under substantially no-load conditions, means for establishing no-load conditions on said dog, and fluid pressure means for effecting movement of said dog in one direction.

108. The combination with a driving and a driven shaft, of one-way engaging means for establishing a drive between said shafts, a planetary gearing associated with said shafts for establishing a different speed drive in the same direction between said shafts and including a controlled gear, a brake for holding said gear against rotation to render said gearing drivingly operable including a radially movable rotatively stationary dog releasable under substantially no-load conditions, means for establishing no-load conditions on said dog, and fluid pressure means for effecting the movement of said dog in one direction.

109. The combination with a driving and a driven shaft, of a planetary gearing for effecting a drive between said driving shaft and driven shaft including a sun gear, a planet gear and a ring gear, holding means for said sun gear comprising a member connected to said sun gear and having a plurality of peripheral notches, and a radially movable dog rotatively stationarily connected to a stationary part and radially movable into and out of engagement with said notches, and means for radially moving said dog out of an engaging notch to permit rotative movement of said sun gear, and a second drive between said driving and driven shafts including one-way engaging means, said second drive being automatically established upon the release of the sun gear of said first-mentioned drive.

110. The combination with a driving shaft and a driven shaft, of means for driving said driven shaft from said driving shaft at a relatively low speed including one-way engaging means, a planetary gearing associated with said shafts for establishing a relatively high speed drive between said shafts, a clutch for establishing the drive between said shafts, said planetary gearing including clutching parts having positively interengaging members engageable only when said members are operating at substantially synchronous speed and releasable only under substantially no-load conditions, and fluid pressure means for moving said clutch members into disengaged position when said no-load conditions are imposed thereon to release said relatively high speed drive, said one-way engaging means automatically establishing said relatively low-speed drive when said high speed drive is released.

111. In a power transmission, a driving shaft adapted to receive a drive from an engine, a driven shaft, a relatively slow speed driving means for driving the driven shaft from the driving shaft, a relatively fast speed driving means for driving the driven shaft at a speed greater than that of the slow speed driving means and including positively interengaging drive control elements adapted to establish, when engaged, said fast speed drive, said relatively slow speed driving means including a control device operating automatically to establish this drive in response to the release of said relatively fast speed driving means, fluid pressure means directly acting on one of said interengaging members for moving the same in one direction, means for biasing said interengaging parts in the opposite direction, means for controlling said fluid pressure means, said interengaging means being releasable only under no-load conditions.

WILLIAM B. BARNES